United States Patent
Wallin et al.

(10) Patent No.: US 11,043,005 B2
(45) Date of Patent: Jun. 22, 2021

(54) LIDAR-BASED MULTI-PERSON POSE ESTIMATION

(71) Applicant: Volvo Car Corporation, Gothenburg (SE)

(72) Inventors: Andreas Wallin, Billdal (SE); Sihao Ding, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/692,761

(22) Filed: Nov. 22, 2019

(65) Prior Publication Data

US 2020/0167954 A1 May 28, 2020

Related U.S. Application Data (60) Provisional application No. 62/770,923, filed on Nov. 23, 2018.

(51) Int. Cl.
```
G06T 7/73      (2017.01)
G06T 15/08     (2011.01)
G06K 9/00      (2006.01)
G01S 17/42     (2006.01)
G01S 17/931    (2020.01)
G01S 7/48      (2006.01)
```

(52) U.S. Cl.
CPC ............. *G06T 7/74* (2017.01); *G01S 7/4802* (2013.01); *G01S 17/42* (2013.01); *G01S 17/931* (2020.01); *G06K 9/00335* (2013.01); *G06T 15/08* (2013.01); *G06T 2207/10028* (2013.01); *G06T 2207/20084* (2013.01); *G06T 2207/30196* (2013.01)

(58) Field of Classification Search
CPC ....................................................... G06T 7/74
USPC ............................................................ 345/424
See application file for complete search history.

(56) References Cited

U.S. PATENT DOCUMENTS

| | | | | |
|---|---|---|---|---|
| 10,282,663 B2 * | 5/2019 | Socher | ................ | G06F 30/00 |
| 10,451,405 B2 * | 10/2019 | Clayton | ................ | G01S 17/42 |

(Continued)

FOREIGN PATENT DOCUMENTS

CN          108898063 A          11/2018

OTHER PUBLICATIONS

Schulz et al., "Pedestrian Intention Recognition using Latent-dynamic Conditional Random Fields," https://ieeexplore.ieee.org/xpl/conhome/7180136/proceeding, Jun. 28-Jul. 1, 2015, 6 pp.

(Continued)

*Primary Examiner* — David T Welch
(74) *Attorney, Agent, or Firm* — Shumaker & Sieffert, P.A.

(57) ABSTRACT

An apparatus and method for estimating the pose of one or more persons is described. An example technique may include receiving a point cloud from a LiDAR sensor, the point cloud including a plurality of points representing positions of objects relative to the LiDAR sensor, processing the point cloud to produce a voxelized frame including a plurality of voxels, processing the voxelized frame using a deep neural network to determine one or more persons relative to the LiDAR sensor and a pose for each of the one or more persons, and outputting a location of the determined one or more persons and the pose for each of the determined one or more persons.

20 Claims, 8 Drawing Sheets

(56) References Cited

U.S. PATENT DOCUMENTS

| | | | |
|---|---|---|---|
| 2007/0174769 | A1 | 7/2007 | Nycz |
| 2014/0139629 | A1 | 5/2014 | Baiyya et al. |
| 2016/0203525 | A1* | 7/2016 | Hara .................... G06K 9/6269 |
| | | | 705/14.56 |
| 2017/0337732 | A1* | 11/2017 | Tamersoy ............ G06K 9/6256 |
| 2018/0089536 | A1 | 3/2018 | Feng et al. |
| 2018/0144496 | A1* | 5/2018 | Posner ...................... G06T 7/73 |
| 2018/0222050 | A1* | 8/2018 | Vu .......................... G01S 17/87 |
| 2018/0275277 | A1* | 9/2018 | Li ........................... G01S 17/86 |
| 2018/0364717 | A1* | 12/2018 | Douillard ............ G05D 1/0212 |
| 2019/0050685 | A1* | 2/2019 | Kaminski ............ G06K 9/6262 |
| 2019/0147372 | A1* | 5/2019 | Luo ...................... G06K 9/6272 |
| | | | 706/20 |
| 2019/0304134 | A1* | 10/2019 | Mauchly ................... G06T 7/75 |
| 2020/0134911 | A1* | 4/2020 | van Hoff ................. G06T 19/00 |
| 2020/0150233 | A1* | 5/2020 | Nian ....................... G01S 17/86 |

OTHER PUBLICATIONS

Schneemann et al., "Context-based Detection of Pedestrian Crossing Intention for Autonomous Driving in Urban Environments," 2016 IEEE/RSJ International Conference on Intelligent Robots and Systems (IROS), Oct. 9-14, 2016, pp. 2243-2248.

Kohler et al., "Stereo-Vision-Based Pedestrian's Intention Detection in a Moving Vehicle," 2015 IEEE 18th International Conference on Intelligent Transportation Systems, 2015 IEEE 18th International Conference on Intelligent Transportation Systems, Sep. 15-18, 2015, pp. 2317-2322.

Fang et al., "On-Board Detection of Pedestrian Intentions," Sensors, vol. 17, No. 10, Sep. 23, 2017, 14 pp.

Kohler et al., "Early Detection of the Pedestrian's Intention to Cross the Street," Conference Record—IEEE Conference on Intelligent Transportation Systems, Sep. 2012, 6 pp.

U.S. Appl. No. 16/692,901, filed Nov. 22, 2019, by Botonjic et al.

Moon et al., "V2V-PoseNet: Voxel-to-Voxel Prediction Network for Accurate 3D Hand and Human Pose Estimation from a Single Depth Map," 2018 IEEE/CVF Conference on Computer Vision and Pattern Recognition, Jun. 2018, pp. 5079-5088.

Sarafianos et al., "3D Human Pose Estimation: A Review of the Literature and Analysis of Covariates," Computer Vision and Image Understanding, vol. 152, Nov. 2016, pp. 1-20.

Ge et al., "3D Convolutional Neural Networks for Efficient and Robust Hand Pose Estimation from Single Depth Images," 2017 IEEE Conference on Computer Vision and Pattern Recognition, Jul. 21-26, 2017, pp. 5679-5688.

Maturana et al., "VoxNet: A 3D Convolutional Neural Network for Real-Time Object Recognition," 2015 IEEE/RSJ International Conference on Intelligent Robots and Systems (IROS), Sep. 28-Oct. 2, 2015, pp. 922-928.

Wu et al., "3D ShapeNets: A Deep Representation for Volumetric Shapes," 2015 IEEE Conference on Computer Vision and Pattern Recognition (CVPR), Jun. 7-12, 2015, pp. 1912-1920.

International Search Report and Written Opinion of International Application No. PCT/US2019/062858, dated Feb. 27, 2020, 14 pp.

Final Office Action issued in U.S. Appl. No. 16/692,901 dated Feb. 19, 2021, 14 pp.

International Preliminary Report on Patentability from International Application No. PCT/US2019/062858 dated Feb. 26, 2021, 18 pp.

Written Opinion of International Application No. PCT/US2019/062858, dated Sep. 24, 2020, 6 pp.

Office Action from U.S. Appl. No. 16/692,901, dated Oct. 8, 2020, 14 pp.

Haque et al. "Towards Viewpoint Invariant 3D Human Pose Estimation," European Conference on Computer Vision, Jul. 26, 2016, 20 pp.

Nguyen et al., "Annotation of Human Gesture using 3D Skeleton Controls," In LREC, May 2010, pp. 3037-3041.

Simon et al., "Hand Keypoint Detection in Single Images using Multiview Bootstrapping," in Proceedings of the IEEE Conference on Computer Vision and Pattern Recognition, Jul. 2017, pp. 1145-1153.

Yuan et al., "The 2017 Hands in the Million Challenge on 3D Hand Pose Estimation," arXiv preprint arXiv:1707.02237, Jul. 7, 2017, 7 pp.

Response to the Written Opinion of International Application No. PCT/US2019/062858 filed Sep. 3, 2020, 15 pp.

Extended European Search Report issued in European Application No. 20162165.3 dated Aug. 4, 2020, 7 pp.

Response to Office Action from U.S. Appl. No. 16/692,901 filed Jan. 8, 2021, 10 pp.

\* cited by examiner

LIDAR-BASED MULTI-PERSON POSE ESTIMATION

This application claims the benefit of U.S. Provisional Application No. 62/770,923, filed Nov. 23, 2018, the entire content of which is incorporated by reference herein.

BACKGROUND

Pose estimation is a computer vision technique where a human figure is detected from image or video data. In addition to detecting the presence of a human figure, computer vision techniques may further determine the position and orientation of the limbs of the human figure (i.e., the pose). Pose estimation can be useful in many fields, including autonomous driving. For example, the pose of a person may be used to determine the attention and intention of a human (e.g., a pedestrian, traffic police officer, etc.). Autonomous driving applications for an automobile may use the predicted or inferred intention and attention of a person from the estimated pose to determine driving behaviors.

SUMMARY

In the examples described below, this application describes techniques and devices for estimating the pose of one or more persons from a point cloud produced by a LiDAR (Light Detection and Ranging) sensor or other similar sensor. In some examples, the estimated pose for the one or more persons may be used to make driving decisions for an autonomous vehicle. However, the techniques of this disclosure are not limited to autonomous driving applications and may be used to estimate the pose of persons for any number of applications where pose estimation may be useful. By using the output of a LiDAR sensor, e.g., as opposed to a camera sensor, pose estimation may be performed quickly in difficult environments, including low-light environments.

A computing system may be configured to receive point cloud data from a LiDAR sensor or other similar sensor. The computing system may be further configured to convert the point cloud data into a structured data format, such as a frame of voxels (volume pixels). The computing system may then process the voxelized frame using a deep neural network. The deep neural network may be configured with a model that determines whether or not a person is present. The deep neural network also may perform a regression to estimate a pose for each of the one or more persons that are detected. In some examples, the computing system makes the determination of a person and the pose estimation serially. That is, in some examples, first the computing system detects a person with the deep neural network and then the computing system estimates the pose of the person using the deep neural network. In other examples, the computing system performs the determination of a person and the pose estimation in parallel. That is, in some examples, the computing system determines the presence of a person and the person's corresponding pose for each voxel at the same time. If the deep neural network determines that a person is not present in the voxel, the computing system discards the estimated pose.

The deep neural network may be configured to process the voxelized frame using one or more three-dimensional (3D) convolutional layers followed by one or more two-dimensional convolutional layers. 3D convolutional layers generally provide for a more accurate determination of a person and pose estimation, while 2D convolutional layers generally provide for a quicker determination of a person and pose estimation. By using a combination of 3D and 2D convolutional layers in the deep neural network, person detection and pose estimation may be performed with a desirable level of accuracy while also maintaining the speed useful for autonomous driving applications.

In one example, this disclosure describes a method for pose estimation, the method comprising receiving a point cloud from a LiDAR sensor, the point cloud including a plurality of points representing positions of objects relative to the LiDAR sensor, processing the point cloud to produce a voxelized frame including a plurality of voxels, processing the voxelized frame using a deep neural network to determine one or more persons relative to the LiDAR sensor and a pose for each of the one or more persons, and outputting a location of the determined one or more persons and the pose for each of the determined one or more persons.

In another example, this disclosure describes an apparatus configured to perform pose estimation, the apparatus comprising a memory configured to receive a point cloud from a LiDAR sensor, and one or more processors implemented in circuitry, the one or more processors in communication with the memory and configured to receive the point cloud from the LiDAR sensor, the point cloud including a plurality of points representing positions of objects relative to the LiDAR sensor, process the point cloud to produce a voxelized frame including a plurality of voxels, process the voxelized frame using a deep neural network to determine one or more persons relative to the LiDAR sensor and a pose for each of the one or more persons, and output a location of the determined one or more persons and the pose for each of the determined one or more persons.

In another example, this disclosure describes an apparatus configured to perform pose estimation, the apparatus comprising means for receiving a point cloud from a LiDAR sensor, the point cloud including a plurality of points representing positions of objects relative to the LiDAR sensor, means for processing the point cloud to produce a voxelized frame including a plurality of voxels, means for processing the voxelized frame using a deep neural network to determine one or more persons relative to the LiDAR sensor and a pose for each of the one or more persons, and means for outputting a location of the determined one or more persons and the pose for each of the determined one or more persons.

In another example, this disclosure describes a non-transitory computer-readable medium may be configured to store instructions that, when executed, causes one or more processors to receive a point cloud from a LiDAR sensor, the point cloud including a plurality of points representing positions of objects relative to the LiDAR sensor, process the point cloud to produce a voxelized frame including a plurality of voxels, process the voxelized frame using a deep neural network to determine one or more persons relative to the LiDAR sensor and a pose for each of the one or more persons, and output a location of the determined one or more persons and the pose for each of the determined one or more persons.

The details of one or more embodiments of the invention are set forth in the accompanying drawings and the description below. Other features, objects, and advantages of the invention will be apparent from the description and drawings, and from the claims.

DETAILED DESCRIPTION

Pose estimation is a computer vision technique where a human figure is detected from an image or video. In addition to detecting the presence of a human figure, computer vision techniques may further determine the position and orientation of the limbs of the human figure (i.e., the pose). Pose estimation can be useful in many fields, including autonomous driving. For example, the pose of a person may be used to determine the attention and intention of a human (e.g., a pedestrian, traffic cop, etc.) or the needs of a human (e.g., a pedestrian raising an arm to hail a taxi). Autonomous driving applications of an automobile may use the predicted intention and attention of a person from the estimated pose to determine driving behaviors.

In some examples, pose estimation is performed on image data received from a camera sensor. Such data has several drawbacks. For example, if the output from the camera sensor does not include depth information, it may be difficult to discern the relative locations of persons in the image. Even if the output from the camera sensor does include depth information, performing pose estimation may be difficult or impossible in dark environments.

This disclosure describes techniques for performing pose estimation using point cloud data, such as point cloud data produced by a LiDAR sensor. The point cloud output from a LiDAR sensor provides a 3D map of objects in the vicinity of the sensor. As such, depth information is available. In addition, as opposed to a camera sensor, a LiDAR sensor may generate the point clouds in a dark environment. The techniques of this disclosure include processing the point cloud from a LiDAR sensor using a deep neural network to detect the presence of persons near the sensor and to estimate the pose of such persons in order to make autonomous driving decisions.

Figure 1:
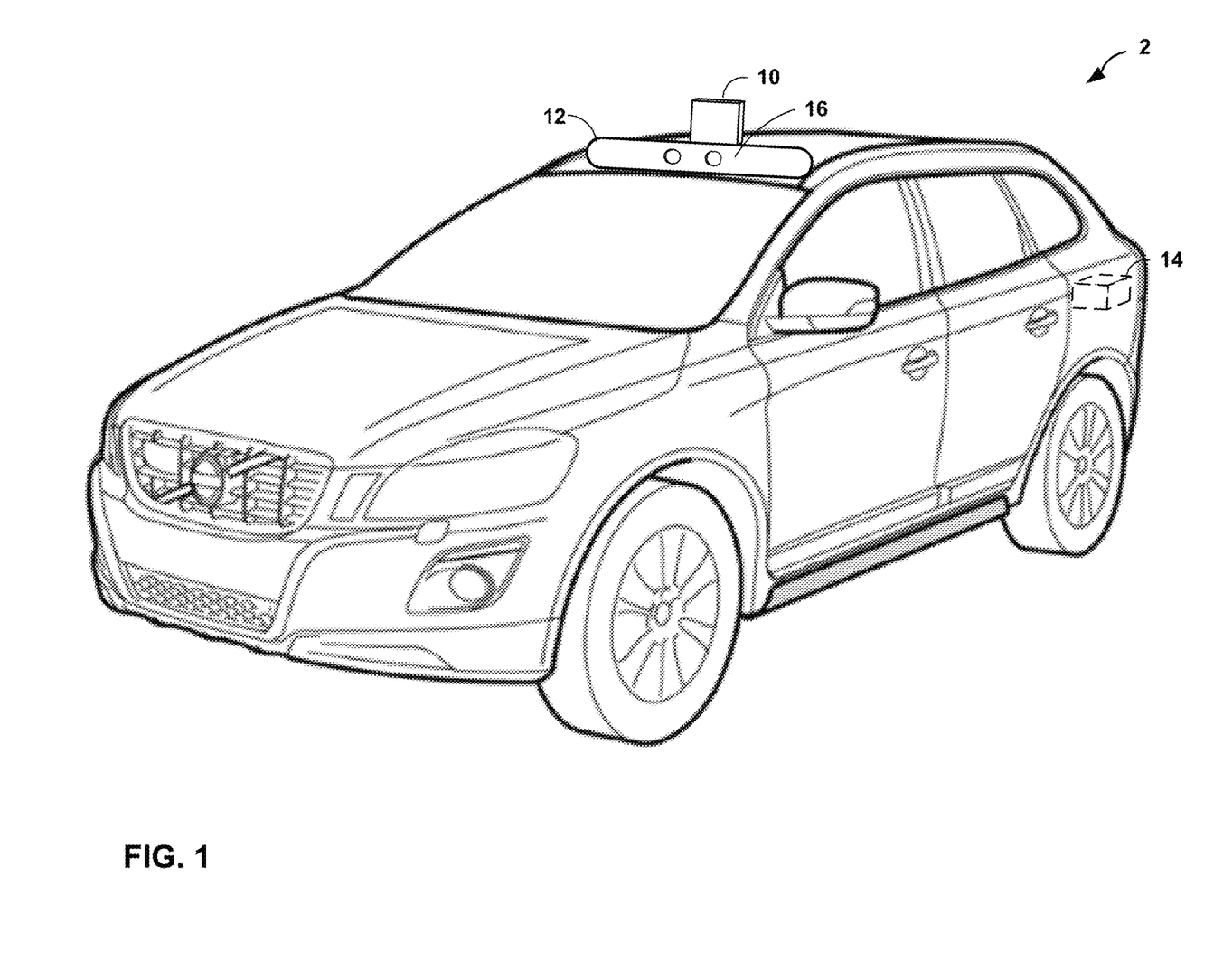
FIG. 1 is a conceptual diagram illustrating an example operating environment of the techniques of this disclosure.

FIG. 1 is a conceptual diagram illustrating an example operating environment of the techniques of this disclosure. In one example of the disclosure, automobile 2 may include components configured to perform pose estimation. In this example, automobile 2 may include a LiDAR sensor 10, a computing system 14, and optionally, a camera(s) 16.

The techniques of this disclosure are described with reference to automotive applications, including autonomous driving applications. However, it should be understood that the techniques of this disclosure for person detection and pose estimation may be used for other contexts.

Automobile 2 may be any type of passenger vehicle. LiDAR sensor 10 may be mounted to automobile 2 using bracket 12. In other examples, LiDAR sensor 10 may be mounted to automobile 2 in other configurations, or integrated in or carried by structure of the automobile, such as bumpers, sides, windshields, or the like. Additionally, automobile 2 may be configured to use a plurality of LiDAR sensors. As will be explained in more detail below, computing system 14 may be configured to receive point cloud data from LiDAR sensor 10 and determine the location and poses of persons in the field of view of LiDAR sensor 10.

LiDAR sensor 10 includes a laser that is configured to emit laser pulses. LiDAR sensor 10 further includes a receiver to receive laser light reflected off objects near LiDAR sensor 10. LiDAR sensor 10 measures distance to an object by illuminating the object with pulsed laser light and measuring the reflected pulses. Differences in return times and wavelengths of the reflected pulses are used to determine a 3-D representation of one or more objects (e.g., people).

LiDAR sensor 10 may further include a global positioning sensor (GPS) or similar sensors to determine the exact physical location of the sensor and objects sensed from the reflected laser light. LiDAR sensor 10 may be further configured to detect additional information, like intensity. The intensity of a point in the point cloud may indicate the reflectivity of the object detected by LiDAR sensor 10. Typically, the 3-D representation captured by LiDAR sensor 10 is stored in the form of a point cloud. Point clouds are a collection of points that represent a 3D shape or feature. Each point has its own set of X, Y and Z coordinates and in some cases additional attributes (e.g., GPS location and intensity). The resulting point clouds of the LiDAR collection method may be saved and/or transmitted to computing system 14.

While LiDAR sensors are described in this disclosure, the techniques for pose estimation described herein may be used with the output of any sensor that works in low light and/or outputs point cloud data. Additional sensor types that may be used with the techniques of this disclosure may include, for example, radar, ultrasonic, camera/imaging sensors, and/or sonar sensors.

Computing system 14 may be connected to LiDAR sensor through wired or wireless communication techniques. Computing system may include one or more processors that are configured to receive the point cloud from LiDAR sensor 10. As will be explained in more detail below, computing system 14 may be configured to perform pose estimation. For example, computing system 14 may be configured to receive the point cloud from LiDAR sensor 10, the point cloud including a plurality of points representing positions of objects relative to the LiDAR sensor, process the point cloud to produce a voxelized frame including a plurality of voxels, process the voxelized frame using a deep neural network to determine one or more persons relative to the LiDAR sensor and a pose for each of the one or more persons, and output a location of the determined one or more persons and the pose for each of the determined one or more persons. The techniques of this disclosure are not limited to the detection and pose estimation for persons (e.g., pedestrians, cyclists, etc.), but may also be used for pose detection of animals (e.g., dogs, cats, etc.).

Bracket 12 may include one or more cameras 16. The use of a bracket is just one example. The cameras 16 may be positioned in any suitable place on automobile 2. Automobile 2 may further include additional cameras not shown in FIG. 1. Computing system 14 may be connected to cameras 16 to receive image data. In one example of the disclosure, computing system 14 may be further configured to perform pose estimation using camera-based techniques. In such examples, computing system 14 may be configured to estimate the poses of one or more persons using both camera-based techniques and the LiDAR-based techniques described in this disclosure. Computing system 14 may be configured to assign weights to each of the poses determined by the camera-based and LiDAR based techniques and determine a final pose of a person based on a weighted average of the determined poses. Computing system 14 may be configured to determine the weights based on a confidence level for each of the techniques. For example, LiDAR-based techniques may have a higher confidence of being accurate, compared to camera-based techniques, in low-light environments.

Figure 2:
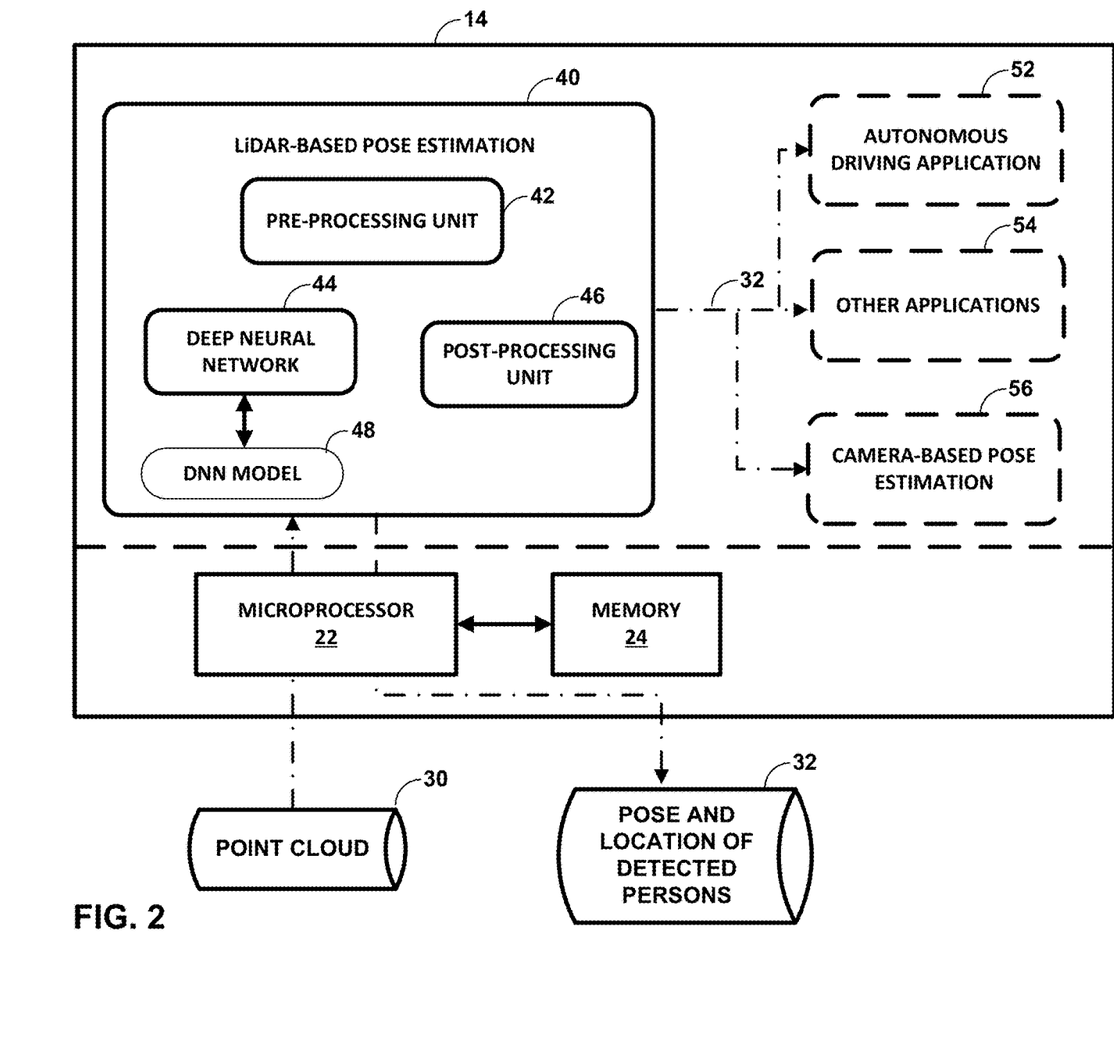
FIG. 2 is a block diagram illustrating an example apparatus configured to perform the techniques of this disclosure.

FIG. 2 is a block diagram illustrating an example apparatus configured to perform the techniques of this disclosure. In particular, FIG. 2 shows an example of computing system 14 of FIG. 1 in more detail. Again, in some examples, computing system 14 may be part of automobile 2. However, in other examples, computing system 14 may be a stand-alone system or may be integrated into other devices for use in other applications which may benefit from pose estimation.

Computing system 14 includes microprocessor 22 in communication with memory 24. In some examples, computing system 14 may include multiple microprocessors. Microprocessor 22 may be implemented as fixed-function processing circuits, programmable processing circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

In the example of FIG. 2, microprocessor 22 may be configured to execute one or more sets of instructions in LiDAR-based pose estimation module 40 to perform pose estimation in accordance with the techniques of this disclosure. The instructions that define LiDAR-based pose estimation module 40 may be stored in memory 24. In some examples, the instructions that define LiDAR-based pose estimation module 40 may be downloaded to the memory 24 over a wired or wireless network.

In some examples, memory 24 may be a temporary memory, meaning that a primary purpose of memory 24 is not long-term storage. Memory 24 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Memory 24 may include one or more non-transitory computer-readable storage mediums. Memory 24 may be configured to store larger amounts of information than typically stored by volatile memory. Memory 24 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Memory 24 may store program instructions (e.g., LiDAR-based pose estimation module 40) and/or information (e.g., point cloud 30 and pose and location of detected persons 32) that, when executed, cause microprocessor 22 to perform the techniques of this disclosure.

The following techniques of the disclosure will be described with reference to microprocessor 22 executing various software modules. However, it should be understood that each of the software modules described herein may also be implemented in dedicated hardware, firmware, software, or any combination of hardware, software, and firmware.

LiDAR-based pose estimation module 40 may include a pre-processing unit 42, a deep neural network (DNN) 44, and a post-processing unit 46. LiDAR-based pose estimation module 40 is configured to receive point cloud 30 from a LiDAR sensor (e.g., LiDAR sensor 10 of FIG. 1). Pre-processing unit 42 is configured to make the unstructured raw input (i.e., point cloud 30) into structuralized frame (e.g., matrix data), so deep neural network 44 can process the input data.

Pre-processing unit 42 may be configured to process point cloud 30 into a structuralized frame in many ways. In one example, pre-processing 42 may be configured to convert the point cloud into voxels (volume pixels). Pre-processing unit 42 may be configured to perform such voxelization according to a pre-defined data structure for the voxels. For example, each of the voxels may be defined by a size of a three-dimensional (3D) bin (e.g., in terms of X, Y, and Z coordinates), as well as the type of data stored for a 3D bin. For example, each 3D bin (i.e., voxel) may include data indicating the number of points from point cloud 30 located in the bin, the location of the points from point cloud 30 in the bin, as well as the intensity of such points. Other examples of data that may be stored in the voxels include mean and variance of height, width, length (x, y, z coordinates), mean and variance of intensity/reflectivity, and other statistics of the point cloud within or even neighboring the voxel. In some examples, a voxel may include zero points from point cloud 30, one point from point cloud 30, or multiple points from point cloud 30. Using pre-defined bins may be referred to as manual voxelization. In other examples, pre-processing unit 42 may be configured to voxelize point cloud 30 in an adaptive manner, e.g., by using a neural network that takes raw point cloud 30 as input and outputs a structured (voxelized) frame.

Deep neural network 44 receives the voxelized frame from pre-processing unit 42. A deep neural network is a type of machine learning algorithm. Deep neural network 44 may be configured with multiple layers of processing layers, each layer configured for determining and/or extracting features from the input data (in this case the voxelized frame of point cloud 30). Each successive layer of deep neural network 44 may be configured to use the output from the previous layer as input.

In some examples, deep neural network 44 may configured as a convolutional deep neural network. A convolutional deep neural network is a type of deep, feed-forward neural network. Each layer of a convolutional deep neural network may be referred to as a convolutional layer. Convolutional layers apply a convolution operation to the input (e.g., a voxel of the voxelized frame), passing the result to the next layer. Deep neural network 44 may be configured with both 3D and 2D convolutional layers. The 3D convolutional layers provide for a more accurate feature extraction (e.g., more accurate identification of persons and corresponding poses), while the 2D convolutional layers provide for a faster feature extraction, as compared to the 3D convolutional layers. Deep neural network 44 may be configured to first process the voxelized frame with one or more 3D convolutional layers, and then continue to process the voxelized frame with one or more 2D convolutional layers. The 2D convolutional layers may be configured to only process data from the voxelized frame in the X and Y direction (i.e., not in the Z direction). The number of 3D and 2D convolutional layers, and the division point between the layers determines the tradeoff between speed and accuracy of the pose estimation. By using a combination of 3D and 2D convolutional layers in deep neural network 44, person detection and pose estimation may be performed with a desirable level of accuracy while also maintaining the speed useful for autonomous driving applications.

Deep neural network 44 is configured to analyze the voxelized frame and produce two outputs for each of the voxels. One output may be called a classification. The classification indicates whether or not a person is present in the voxel being analyzed. The other output may be called a pose estimation that is produced from a regression. The regression determines the pose of the person (or a key point of a person) if such a person is present in the voxel. As will be explained in more detail below, deep neural network 44 may be configured to perform the classification and regression techniques in serial or in parallel.

Deep neural network 44 may be configured to process each voxel through DNN model 48. DNN model 48 defines the number of 3D and 2D convolutional layers as well as the function performed for each layer. DNN model 48 may be trained with a large number of data-label pairs. In the data label-pair, the data is the voxelized point cloud data, while the label is a possible 3D pose. DNN model 48 is trained by manually annotating (e.g., labeling) point cloud data, and then training deep neural network 44 with the labeled data. The output of deep neural network 44 is compared to the expected output given the labeled data. Technicians may then adjust DNN model 48 to find an optimal set of weights for the layers of deep neural network 44 so that given a pre-annotated point cloud, the desired label is predicted when processed by deep neural network 44. DNN model 38 may be predefined and may be periodically updated.

Deep neural network 44 may be configured to produce a classification and regression results for each anchor position. In one example, deep neural network may be configured to consider the center of a voxel as an anchor position. For each anchor position, deep neural network 44 may be configured to compare the data stored in the voxel to one or more predefined anchor skeletons (also called a standard or canonical skeleton). The anchor skeleton may be defined by a plurality of key points. In one example, anchor skeletons are defined by fourteen joints and/or key points: head, neck, left shoulder, right shoulder, left elbow, right elbow, left hand, right hand, left waist, right waist, left knee, right knee, left foot, and right foot. In general, a key point may correspond to a feature or structure of the human anatomy (e.g., a point on the human body).

During processing by deep neural network 44, an anchor skeleton is activated (i.e., classified as positive for the presence of a person) if the overlapping area between a bounding box of the anchor skeleton and that of any ground truth skeleton (i.e., the data present in the voxel) satisfies a threshold condition. For example, if the overlapping area of the bounding box of the anchor skeleton and the voxel is above a certain threshold (e.g., 0.5), the anchor skeleton is activated for that voxel and the presence of a person is detected. The threshold may be a measurement of the amount of overlap (e.g., the intersection-over-union (IOU). Deep neural network 44 may make the classification based on comparison to one or more multiple different anchor skeletons. Deep neural network 44 may also be performed to perform a regression that encodes the difference between an anchor skeleton and the ground truth skeleton (i.e., the data in the actual voxel). Deep neural network 44 may be configured to encode this difference for each of a plurality of key points defined for the anchor skeleton. The difference between the key points of the anchor skeleton and the data in the voxel is indicative of the actual pose of the person detected during classification. Deep neural network may then be configured to provide the classification (e.g., a location of the determined one or more persons) and the pose for each of the determined one or more persons to post-processing unit 46. When multiple persons are detected from the point cloud, multiple anchor skeletons will be activated, thus achieving multi-person pose estimation.

Post-processing unit 46 may be configured to turn the output of deep neural network 44 into final output. For example, post-processing unit 46 may be configured to perform non-maximum suppression on the classified and estimated poses produced by deep neural network 44 and produce a final location and pose of the persons detected. Non-maximum suppression is an edge thinning technique. In some cases, deep neural network 44 will classify persons and estimate poses for many closely spaced groups of voxels where only one person actually exists. That is, in some circumstances, deep neural network will detect overlapping duplicates of the same person. Post-processing unit 46 may use non-maximum suppression techniques to remove duplicate skeletons. Post-processing unit 46 outputs the pose and location of the detected persons data 32. Pose and location of the detected persons data 32 may include the location of a person detected by LiDAR-based pose estimation module 40 (e.g., in terms of GPS coordinates) as well as a pose of a skeleton defining the person (e.g., the location of the key points). The pose and location of the detected persons data 32 may be stored in memory 24, sent to autonomous driving application 52, other applications 54, camera-based pose estimation application 56, or transmitted from computing system 14 to another computing system.

In one example, autonomous driving application 52 may be configured to receive pose and location of detected persons data 32 and predict or determine the intention and/or attention, or other behavioral cues of the identified persons to make autonomous driving decisions.

In other examples, camera-based pose estimation application 56 may receive pose and location of detected persons data 32. Camera-based pose estimation application 56 may be configured to determine a pose of one or more persons using image data produced by cameras 16 (FIG. 1). Camera-based pose estimation application 56 may be further configured to assign weights to each of the poses determined by the camera-based and LiDAR based techniques and determine a final pose of a person based on a weighted average of the determined poses. Camera-based pose estimation application 56 may be configured to determine the weights based on a confidence level for each of the techniques. For example, LiDAR-based techniques may have a higher confidence of being accurate, compared to camera-based techniques, in low-light environments.

Other applications 54 represent various other contexts in which pose and location of detected persons data 32 may be used in other contexts. For example, the poses and locations output by LiDAR-based pose estimation module 40 may be used in various applications for body language recognition, motion understanding (e.g., traffic, police officers, emergency services personnel, or other personnel signaling/directing traffic), attention and intention detection (e.g., pedestrians waiting/crossing streets), movies, animation, gaming, robotics, human-computer interaction, machine learning, virtual reality, alternative reality, surveillance, abnormal behavior detection, and public security.

Figure 3:
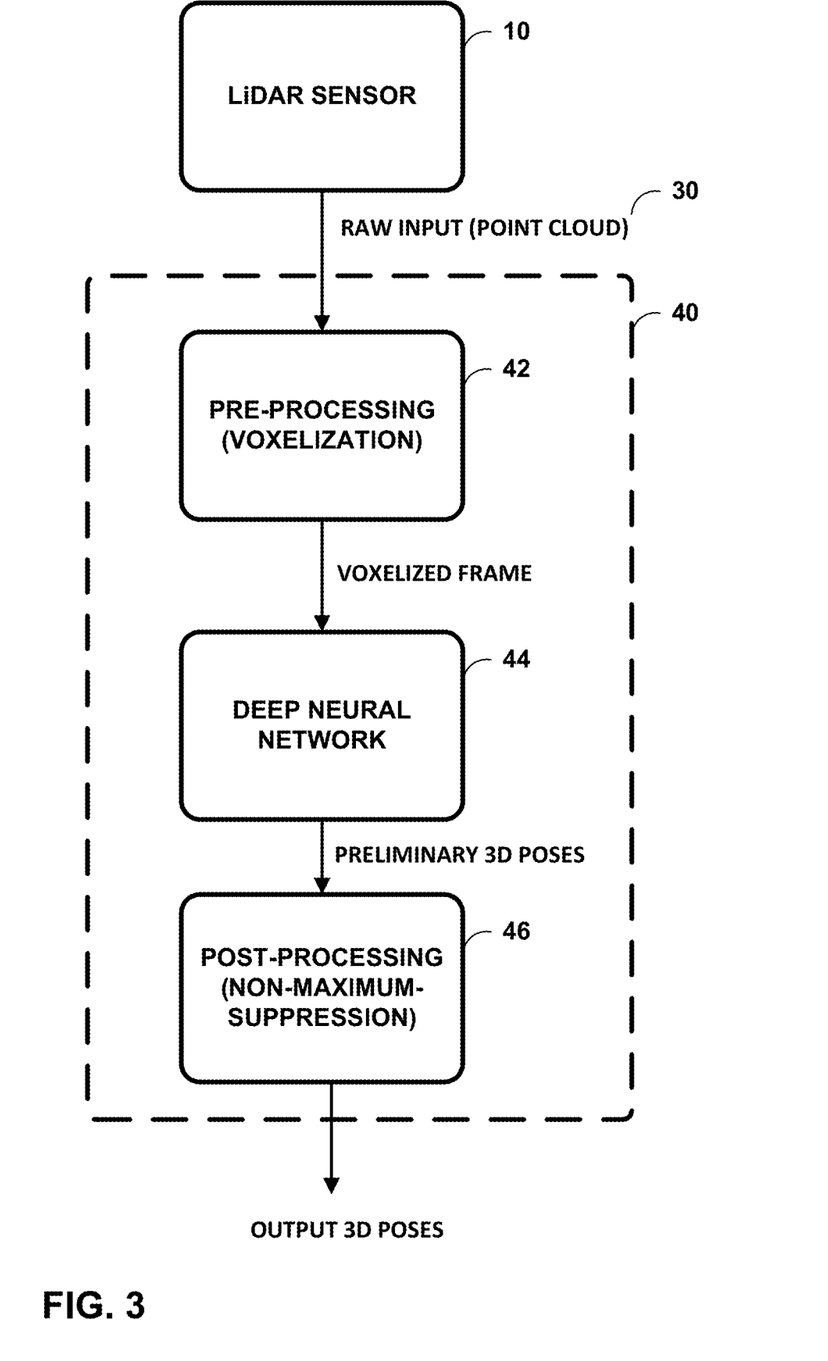
FIG. 3 is a block diagram illustrating a process flow of one example of the disclosure.

FIG. 3 is a block diagram illustrating a process flow of one example of the disclosure. As shown in FIG. 3, LiDAR sensor 10 may be configured to capture a point cloud 30 that is the raw input to LiDAR-based pose estimation module 40. LiDAR-based pose estimation module 4 processes point cloud 30 with pre-processing unit 42 (voxelization) to produce a voxelized frame. Deep neural network 44 then processes the voxelized frame to produce classifications of one or more persons (e.g., the location of one or more persons) as well as the pose or poses for the classified one or more persons. The pose for a person is defined by the locations of a plurality of key points of a skeleton. The output of deep neural network 44 are preliminary 3D poses. Post-processing unit 46 processes the preliminary 3D poses with a non-maximum suppression algorithm to produce the output 3D poses.

Figure 4:
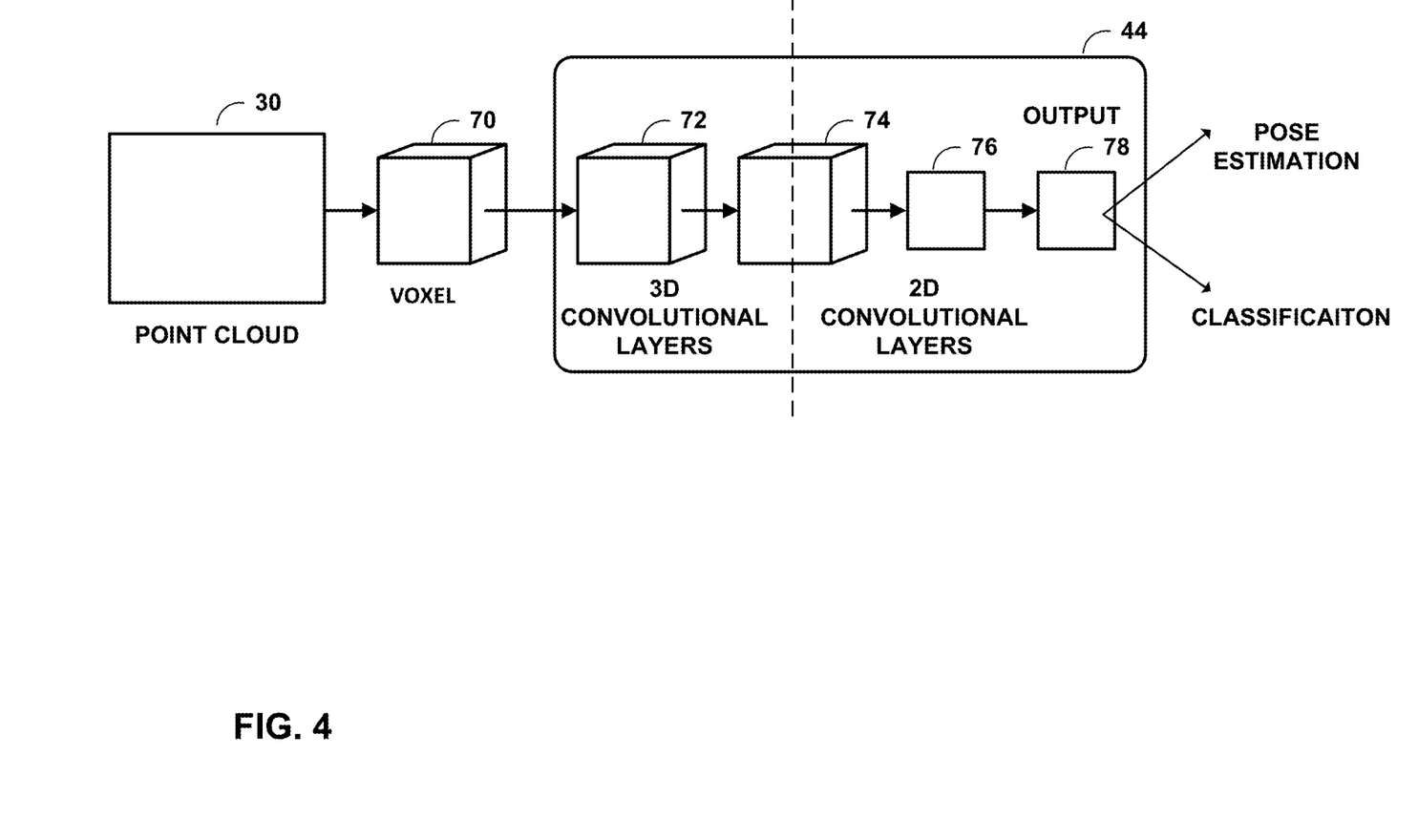
FIG. 4 is a conceptual diagram illustrating a parallel process flow using a deep neural network according to one example of the disclosure.

FIG. 4 is a conceptual diagram illustrating a parallel process flow using a deep neural network according to one example of the disclosure. As shown in FIG. 4, point cloud 30 is first converted to voxelized frame that includes a plurality of voxels. In this example, deep neural network 44 processes each voxel 70 of the voxelized frame. Deep neural network 44 processes voxel 70 using one or more 3D convolutional layers 72. 3D convolutional layer 74 represents the last layer that operates on 3D voxel data. After 3D convolutional layer 74, deep neural network 44 processes voxel 70 with one or more 2D convolutional layers 76. The 2D convolutional layers 76 operate on only two dimensions of voxel data (e.g., XY data). 2D convolutional layer 78 represents the last 2D convolutional layer which outputs both a classification and a pose estimation. In the example of FIG. 4, the layers of deep neural network 44 are configured to classify and estimate poses for each of the voxels in parallel. That is, layers of deep neural network 44 may be configured to classify and estimate poses for more than one voxel at the same time. If deep neural network 44 determines that the voxel is not to be classified as a person, any estimated pose may be discarded.

Figure 5:
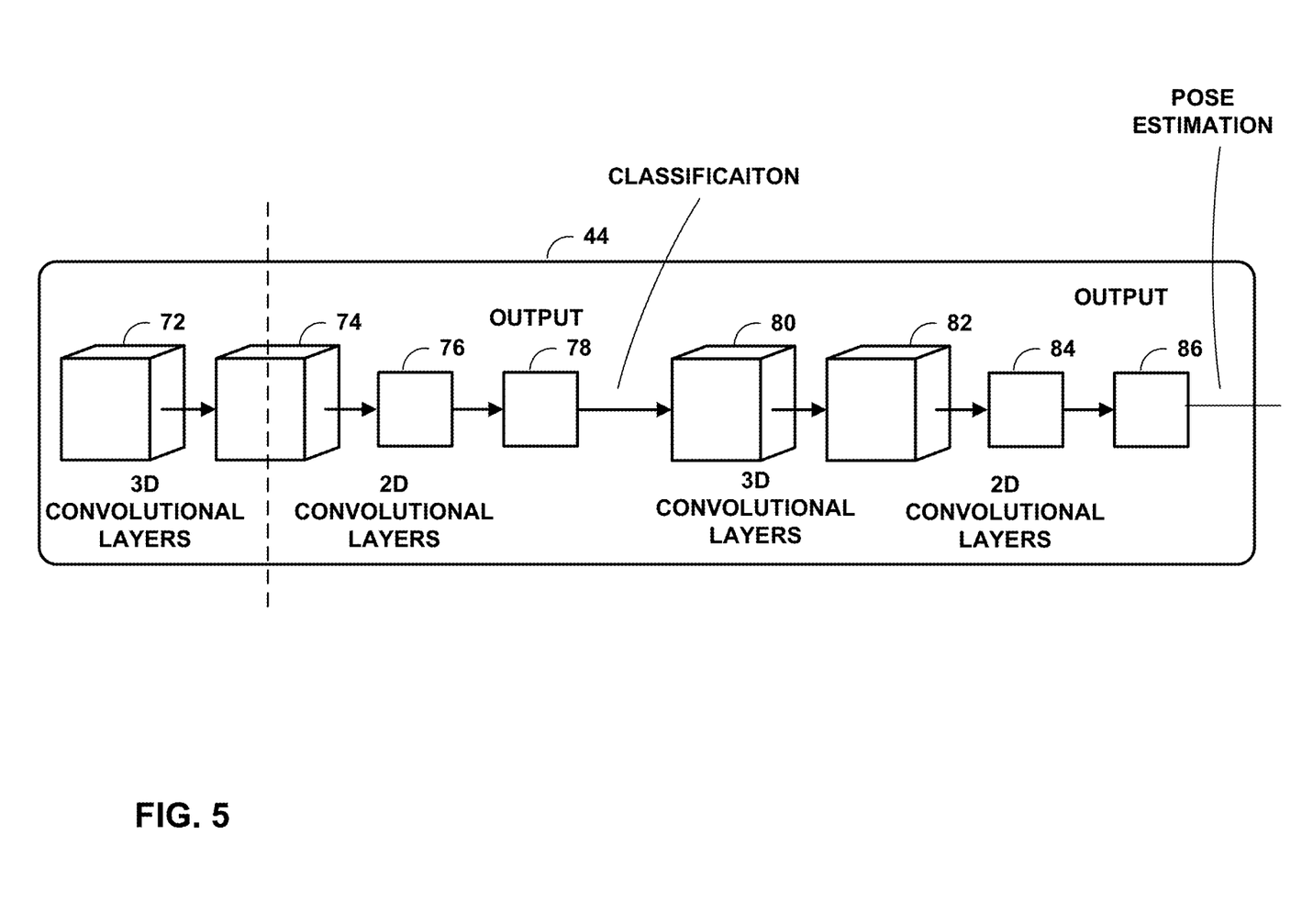
FIG. 5 is a conceptual diagram illustrating a sequential process flow using a deep neural network according to one example of the disclosure.

FIG. 5 is a conceptual diagram illustrating a sequential process flow using a deep neural network according to one example of the disclosure. In the example of FIG. 5, 3D convolutional layers 72 and 74, and 2D convolutional layers 76 and 78 are configured to only classify an input voxel as being a person or not. If 2D convolutional layer 78 does not classify a person, the process is ended. If 2D convolutional layer 78 does classify a person, deep neural network 44 will then process the input voxel using 3D convolutional layers 80 and 82 and 2D convolutional layers 84 and 86 to estimate a pose of the classified person. That is, deep neural network 44 may be configured to use separate neural networks for classification and pose estimation. In this example, the classification and pose estimation processes are performed sequentially.

Figure 6:
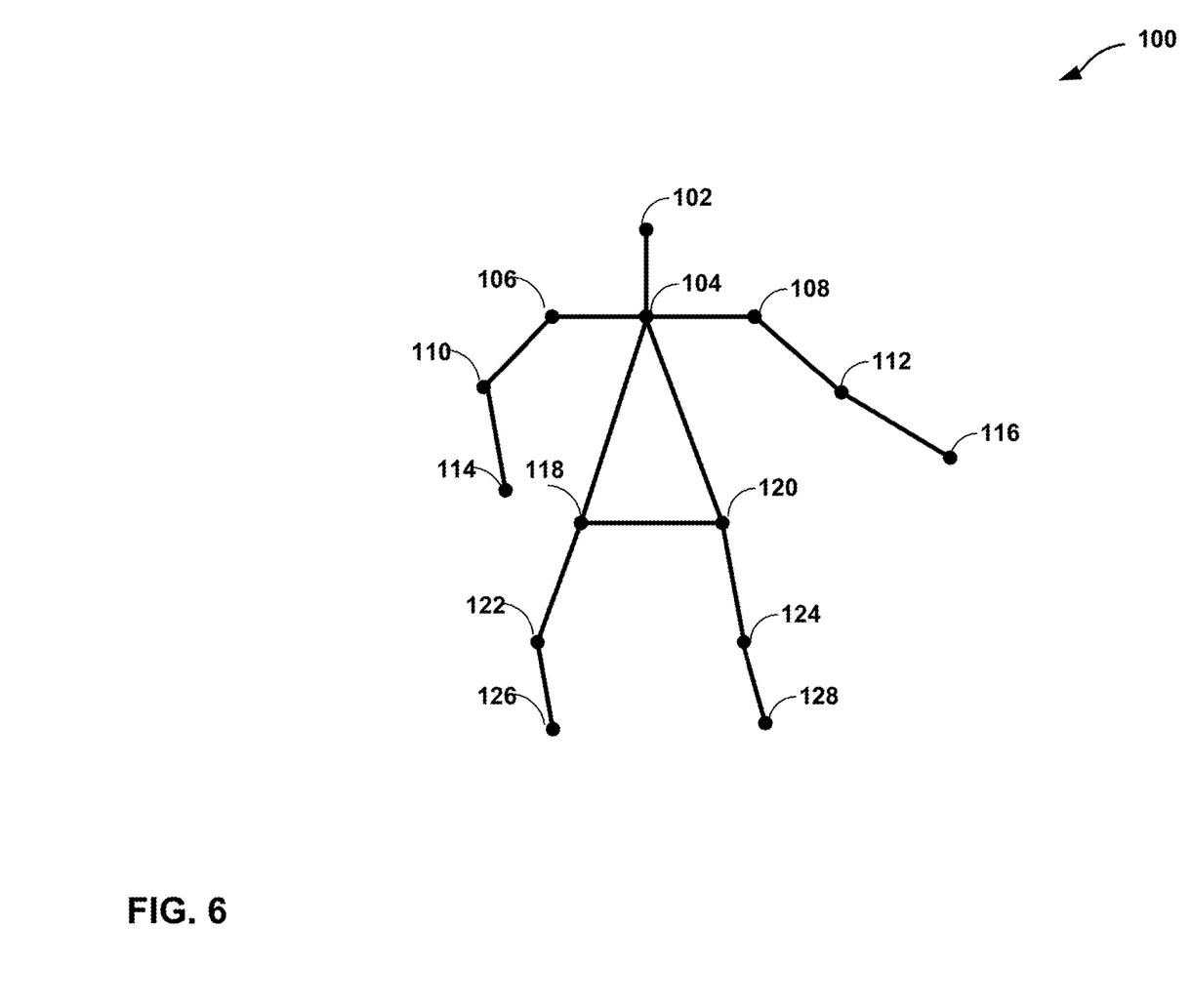
FIG. 6 is a conceptual diagram showing an example anchor skeleton.

FIG. 6 is a conceptual diagram showing an example skeleton. Skeleton 100 may represent either a predefined anchor skeleton or the pose of a ground truth skeleton estimated using the techniques of the disclosure described above. In one example of the disclosure, skeleton 100 may be defined by a plurality of key points and/or joints. In the example of FIG. 6, skeleton 100 comprises 14 key points. As shown in FIG. 6, skeleton 100 is defined by head key point 102, neck key point 104, left shoulder key point 108, right shoulder key point 106, left elbow 112, right elbow key point 110, left hand key point 116, right hand key point 114, left waist key point 120, right waist key point 118, left knee key point 124, right knee key point 122, left foot key point 128, and right foot key point 126. To determine a pose, microprocessor 22 (see FIG. 2) may be configured to determine a location (e.g., a location in 3D space) of each of the key points of skeleton 100. That is, the locations of each of the key points of skeleton 100 relative to each other define the pose of the skeleton, and thus the pose of the person detected from the point cloud.

For other applications, more or fewer key points may be used. The more key points that are used to define skeleton 100, the greater number of unique poses that may be estimated. However, more key points may also result in a longer processing time to estimate the pose.

Figure 7:
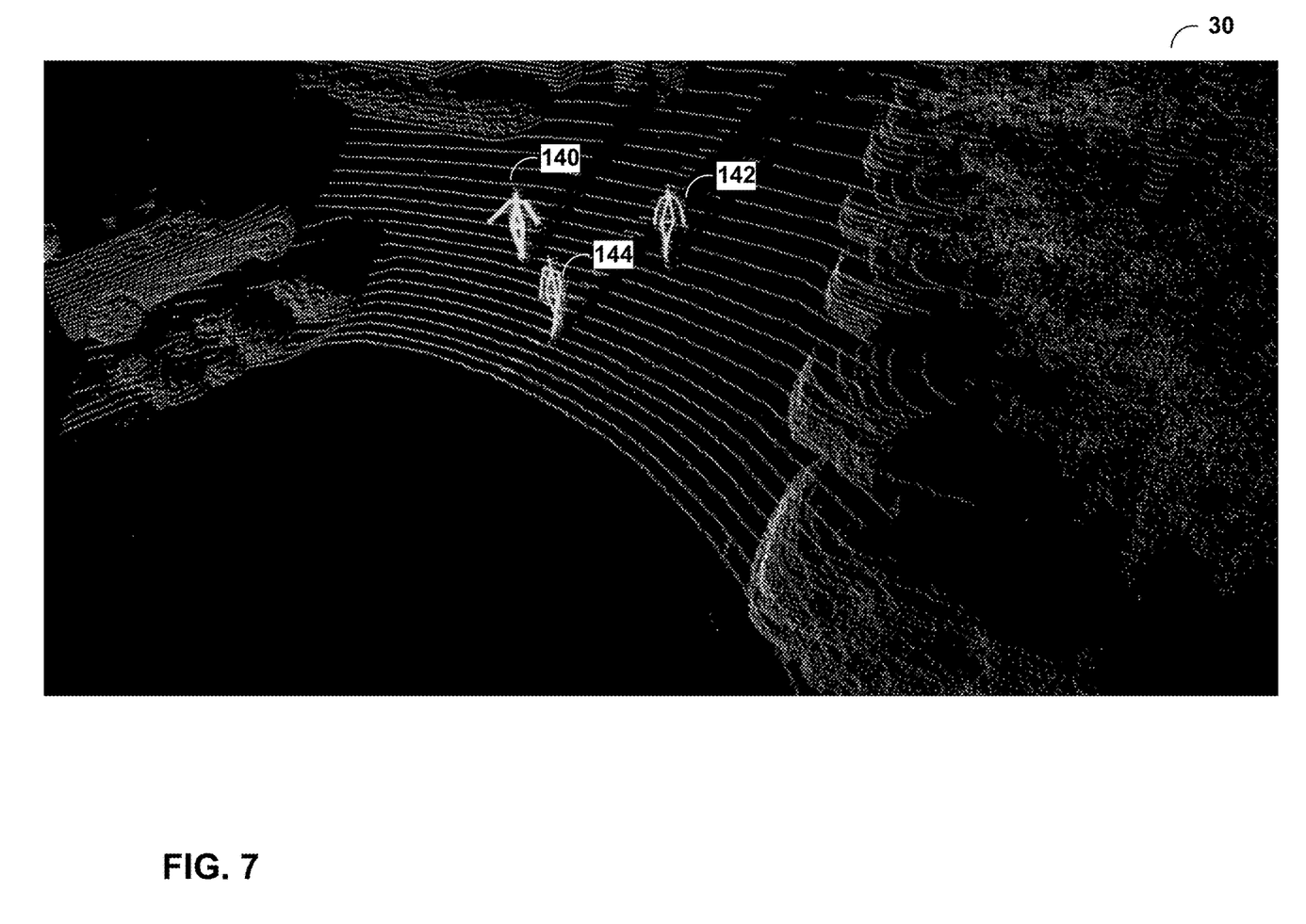
FIG. 7 is a conceptual diagram showing an example point cloud with multiple classified skeletons with estimated poses.

FIG. 7 is a conceptual diagram showing an example point cloud 30 with multiple classified skeletons with estimated poses. As shown in FIG. 7, point cloud 30 is shown with a visualization of three detected skeletons 140, 142, and 144. The skeletons are shown with different poses that may be seen by the different locations of the 14 key points from FIG. 6. Note that skeleton 140 shows one example of skeleton that has not been processed by a non-maximum suppression algorithm. Rather than showing a single skeleton, skeleton 140 is actually multiple overlapping skeletons. In some examples of the disclosure, rather than just outputting data indicating the location and poses of detected persons, computing system 14 may be further configured to produce a visualization of the detected skeletons, such as the visualization shown in FIG. 7.

Figure 8:
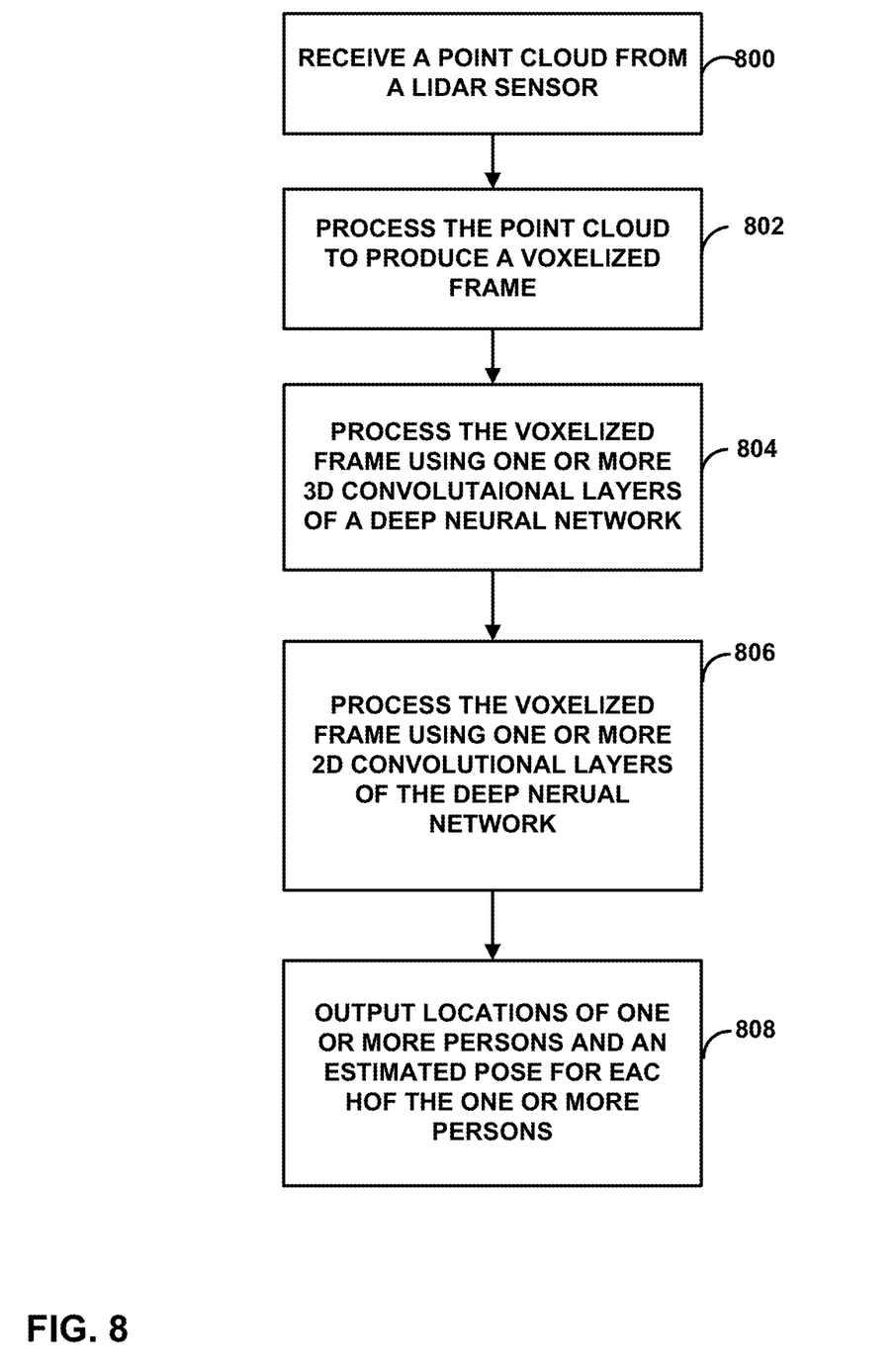
FIG. 8 is a flowchart illustrating an example operation of an apparatus configured to perform pose estimation in accordance with one example of the disclosure.

FIG. 8 is a flowchart illustrating an example operation of an apparatus configured to perform pose estimation in accordance with one example of the disclosure. One or more processors may be configured to perform the techniques shown in FIG. 8, including microprocessor 22 of computing system 14. As described above, in some examples, computing system 14 may be part of automobile 2. In this example, automobile 2 may be configured to use the pose estimation produced by computing system 14 to make autonomous driving decisions. However, the techniques of this disclosure are not so limited. Any processor or processing circuitry may be configured to perform the techniques of FIG. 8 for pose estimation for any number of applications, including AR/VR, gaming, HCI, surveillance and monitoring, and the like.

In one example of the disclosure, computing system 14 may include memory 24 configured to receive a point cloud 30 (see FIG. 2) from LiDAR sensor 10 (see FIG. 1). Computing system 14 may further include one or more processors implemented in circuitry (e.g., microprocessor 22 of FIG. 2), the one or more processors being in communication with the memory. Microprocessor 22 may be configured to receive the point cloud from LiDAR sensor 10 (800). The point cloud includes a plurality of points representing positions of objects relative to LiDAR sensor 10. Microprocessor 22 may be further configured to process the point cloud to produce a voxelized frame including a plurality of voxels (802). In one example of the disclosure, each voxel of the voxelized frame includes a data structure that indicates the presence or absence of points from the point cloud in the voxel.

Microprocessor 22 may be further configured to process the voxelized frame using one or more 3D convolutional layers of a deep neural network (804), and to process the voxelized frame using one or more 2D convolutional layers of the deep neural network (806). Microprocessor 22 processes the voxelized frame using the 3D and 2D convolutional layers to determine one or more persons relative to the LiDAR sensor and a pose for each of the one or more persons. Microprocessor 22 may then output a location of the determined one or more persons and the pose for each of the determined one or more persons (808).

In one example, microprocessor 22 may be configured to determine, for a first voxel of the voxelized frame, if a person is present, and activate an anchor skeleton for the first voxel based on the determination, wherein the data represented in the first voxel is defined as a ground truth skeleton. Microprocessor 22 may be configured to determine the presence of persons and a pose of such persons either sequentially or in parallel. In one example, microprocessor 22 may be configured to determine, in parallel with determining if the person is present, a difference between the ground truth skeleton and the anchor skeleton, estimate a pose of the ground truth skeleton based on the difference, and output the pose in the case that the anchor skeleton is activated. In another example, microprocessor 22 may be configured to determine a difference between the ground truth skeleton and the anchor skeleton in the case that the anchor skeleton is activated, estimate a pose of the ground truth skeleton based on the difference, and output the pose.

The anchor skeleton is defined by a plurality of key points. To determine the difference between the ground truth skeleton and the anchor skeleton, microprocessor 22 may be configured to determine the difference between the ground truth skeleton and each of the key points of the anchor skeleton.

In another example of the disclosure, microprocessor 22 may be further configured to process the determined one or more persons relative to the LiDAR sensor and the pose for each of the one or more persons using a non-maximum-suppression technique to remove duplicates of the one or more persons.

In other examples of the disclosure, the pose estimation techniques of this disclosure may be extended over a series of frames to detect a sequence of poses that may make up a certain action (e.g., waving, walking, running, etc.). Such action recognition may use temporal information (e.g., LiDAR point cloud data from multiple time instances) to perform the action recognition. Accordingly, in one example, DNN 44 may be configured to process a plurality of voxelized frames determine at least one person relative to a LiDAR sensor and a sequence of poses for the at least one person. DNN 44 may then determine an action for the at least one person from the sequence of poses. Two examples ways of implementing action recognition are described below.

In a first example, DNN 44 may be configured to stack and/or concatenate a fixed number of outputs for each frame of point clouds 30 into a single data sample. DNN 44 may feed the single data sample into a classifier to classify the action category. At frame index t, DNN 44 may be configured to use a time window size of w to produce a single sample which is the combined w output from frame t-w+1 to t. DNN 44 may be configured to include a classifier that is a (multi-class) deep neural network or any type of machine learning model, such as a support-vector machine (SVM).

In another example, DNN 44 may be configured to use a per frame output in a sequential manner. For example, DNN 44 may be configured to feed the per frame output into a Recursive Neural Network, and determine a prediction of the action either at every frame or after a certain number of frames.

So, instead of or in addition to per frame pose estimation (e.g., the skeleton output), DNN 44 may be configured to either stitch outputs as a batch or feed the outputs sequentially to obtain a higher level of action recognition. Some of the possible categories for actions to recognize may include standing, walking, running, biking, skateboarding, waving, etc.

Additional examples and combinations of techniques of the disclosure are described below.

1. A method for pose estimation, the method comprising: receiving a point cloud from a LiDAR sensor, the point cloud including a plurality of points representing positions of objects relative to the LiDAR sensor; processing the point cloud to produce a voxelized frame including a plurality of voxels; processing the voxelized frame using a deep neural network to determine one or more persons relative to the LiDAR sensor and a pose for each of the one or more persons; and outputting a location of the determined one or more persons and the pose for each of the determined one or more persons.

2. The method of claim 1, wherein each voxel of the voxelized frame includes a data structure that indicates the presence or absence of points from the point cloud in the voxel.

3. The method of claim 1 or 2, wherein processing the voxelized frame using the deep neural network comprises: processing the voxelized frame using a convolutional deep neural network, wherein the convolutional deep neural network includes one or more three-dimensional convolutional layers followed by one or more two-dimensional convolutional layers.

4. The method of any combination of claim 1-3, wherein processing the voxelized frame using the deep neural network comprises: determining, for a first voxel of the voxelized frame, if a person is present; and activating an anchor skeleton for the first voxel based on the determination, wherein the data represented in the first voxel is defined as a ground truth skeleton.

5. The method of any combination of claims 1-4, further comprising: determining, in parallel with determining if the person is present, a difference between the ground truth skeleton and the anchor skeleton; estimating a pose of the ground truth skeleton based on the difference; and outputting the pose in the case that the anchor skeleton is activated.

6. The method of any combination of claims 1-4, further comprising: determining a difference between the ground truth skeleton and the anchor skeleton in the case that the anchor skeleton is activated; estimating a pose of the ground truth skeleton based on the difference; and outputting the pose.

7. The method of any combination of claims 1-6, wherein the anchor skeleton is defined by a plurality of key points.

8. The method of any combination of claims 1-7, wherein determining the difference between the ground truth skeleton and the anchor skeleton comprises: determining the difference between the ground truth skeleton and each of the key points of the anchor skeleton.

9. The method of any combination of claims 1-8, further comprising: processing the determined one or more persons relative to the LiDAR sensor and the pose for each of the one or more persons using a non-maximum-suppression technique to remove duplicates of the one or more persons.

10. An apparatus configured to perform pose estimation, the apparatus comprising: a memory configured to receive a point cloud from a LiDAR sensor; and one or more processors implemented in circuitry, the one or more processors in communication with the memory and configured to: receive the point cloud from the LiDAR sensor, the point cloud including a plurality of points representing positions of objects relative to the LiDAR sensor; process the point cloud to produce a voxelized frame including a plurality of voxels; process the voxelized frame using a deep neural network to determine one or more persons relative to the LiDAR sensor and a pose for each of the one or more persons; and output a location of the determined one or more persons and the pose for each of the determined one or more persons.

11. The apparatus of claim 10, wherein each voxel of the voxelized frame includes a data structure that indicates the presence or absence of points from the point cloud in the voxel.

12. The apparatus of any combination of claims 10-11, wherein to process the voxelized frame using the deep neural network, the one or more processors are further configured to: process the voxelized frame using a convolutional deep neural network, wherein the convolutional deep neural network includes one or more three-dimensional convolutional layers followed by one or more two-dimensional convolutional layers.

13. The apparatus of any combination of claims 10-12, wherein to process the voxelized frame using the deep neural network, the one or more processors are further configured to: determine, for a first voxel of the voxelized frame, if a person is present; and activate an anchor skeleton for the first voxel based on the determination, wherein the data represented in the first voxel is defined as a ground truth skeleton.

14. The apparatus of any combination of claims 10-13, wherein the one or more processors are further configured to: determine, in parallel with determining if the person is present, a difference between the ground truth skeleton and the anchor skeleton; estimate a pose of the ground truth skeleton based on the difference; and output the pose in the case that the anchor skeleton is activated.

15. The apparatus of any combination of claims 10-13, wherein the one or more processors are further configured to: determine a difference between the ground truth skeleton and the anchor skeleton in the case that the anchor skeleton is activated; estimate a pose of the ground truth skeleton based on the difference; and output the pose.

16. The apparatus of any combination of claims 10-15, wherein the anchor skeleton is defined by a plurality of key points.

17. The apparatus of any combination of claims 10-11, wherein to determine the difference between the ground truth skeleton and the anchor skeleton, the one or more processors are further configured to: determine the difference between the ground truth skeleton and each of the key points of the anchor skeleton.

18. The apparatus of any combination of claims 10-17, wherein the one or more processors are further configured to: process the determined one or more persons relative to the LiDAR sensor and the pose for each of the one or more persons using a non-maximum-suppression technique to remove duplicates of the one or more persons.

19. The apparatus of any combination of claims 10-18, wherein the apparatus comprises an automobile that includes the LiDAR sensor.

20. An apparatus configured to perform pose estimation, the apparatus comprising: means for receiving a point cloud from a LiDAR sensor, the point cloud including a plurality of points representing positions of objects relative to the LiDAR sensor; means for processing the point cloud to produce a voxelized frame including a plurality of voxels; means for processing the voxelized frame using a deep neural network to determine one or more persons relative to the LiDAR sensor and a pose for each of the one or more persons; and means for outputting a location of the determined one or more persons and the pose for each of the determined one or more persons.

21. An apparatus configured to perform pose estimation, the apparatus comprising means for performing any combination of steps in the processes of claims 1-9.

22. A non-transitory computer-readable medium may be configured to store instructions that, when executed, causes one or more processors to receive a point cloud from a LiDAR sensor, the point cloud including a plurality of points representing positions of objects relative to the LiDAR sensor, process the point cloud to produce a voxelized frame including a plurality of voxels, process the voxelized frame using a deep neural network to determine one or more persons relative to the LiDAR sensor and a pose for each of the one or more persons, and output a location of the determined one or more persons and the pose for each of the determined one or more persons.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable data storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Any changes and/or modifications to the methods and apparatus of the techniques disclosed which are known to a person of ordinary skill in the art are within the scope of invention. Various examples of the invention have been described. These and other embodiments are within the scope of the following claims.

What is claimed is:

1. A method for pose estimation, the method comprising:
receiving a point cloud from a LiDAR sensor, the point cloud including a plurality of points representing positions of objects relative to the LiDAR sensor, wherein each of the plurality of points indicates a position and an intensity;
processing the point cloud to produce a voxelized frame including a plurality of voxels, wherein each of the plurality of voxels includes a number of the points of the point cloud in the voxel, the positions of the points in the voxel, and the intensities of the points in the voxel;
processing the voxelized frame using a network to determine a position of one or more persons relative to the LiDAR sensor and a pose for each of the one or more persons, wherein processing the voxelized frame using the network comprises:
determining, for a first voxel of the voxelized frame, if a person is present;
activating an anchor skeleton for the first voxel based on the determination;
determining a difference between data represented in the first voxel and the anchor skeleton in the case that the anchor skeleton is activated; and
estimating a pose of the data represented in the first voxel based on the difference; and
outputting a location of the determined one or more persons and the pose for each of the determined one or more persons.

2. The method of claim 1, wherein each voxel of the voxelized frame includes a data structure that indicates the presence or absence of points from the point cloud in the voxel.

3. The method of claim 1, wherein the network is a convolutional deep neural network, and
wherein the convolutional deep neural network includes one or more three-dimensional convolutional layers followed by one or more two-dimensional convolutional layers.

4. The method of claim 1, further comprising:
determining, in parallel with determining if the person is present, the difference between data represented in the first voxel and the anchor skeleton.

5. The method of claim 1, wherein the anchor skeleton is defined by a plurality of key points, and wherein determining the difference between the data represented in the first voxel and the anchor skeleton comprises:
determining the difference between the data represented in the first voxel and each of the key points of the anchor skeleton.

6. The method of claim 1, further comprising:
processing the determined one or more persons and the pose for each of the one or more persons using a non-maximum suppression technique to remove duplicates of the one or more persons.

7. The method of claim 1, wherein the network is a deep neural network, the method further comprising:
processing a plurality of voxelized frames using the deep neural network to determine at least one person relative to the LiDAR sensor and a sequence of poses for the at least one person; and
determining an action for the at least one person from the sequence of poses.

8. The method of claim 1, wherein processing the point cloud to produce the voxelized frame including the plurality of voxels comprises:
adaptively generating the plurality of voxels using a neural network.

9. The method of claim 1, further comprising:
making an autonomous driving decision based on the pose for each of the determined one or more persons.

10. An apparatus configured to perform pose estimation, the apparatus comprising:
a memory configured to receive a point cloud from a LiDAR sensor; and
one or more processors implemented in circuitry, the one or more processors in communication with the memory and configured to:
receive the point cloud from the LiDAR sensor, the point cloud including a plurality of points representing positions of objects relative to the LiDAR sensor, wherein each of the plurality of points indicates a position and an intensity;
process the point cloud to produce a voxelized frame including a plurality of voxels, wherein each of the plurality of voxels includes a number of the points of the point cloud in the voxel, the positions of the points in the voxel, and the intensities of the points in the voxel;
process the voxelized frame using a network to determine a position of one or more persons relative to the LiDAR sensor and a pose for each of the one or more persons, wherein to process the voxelized frame using the network, the one or more processors are further configured to:

determine, for a first voxel of the voxelized frame, if a person is present;

activate an anchor skeleton for the first voxel based on the determination;

determine a difference between data represented in the first voxel and the anchor skeleton in the case that the anchor skeleton is activated; and estimate a pose of the data represented in the first voxel based on the difference; and output a location of the determined one or more persons and the pose for each of the determined one or more persons.

11. The apparatus of claim 10, wherein each voxel of the voxelized frame includes a data structure that indicates the presence or absence of points from the point cloud in the voxel.

12. The apparatus of claim 10, wherein the network is a convolutional deep neural network, and wherein the convolutional deep neural network includes one or more three-dimensional convolutional layers followed by one or more two-dimensional convolutional layers.

13. The apparatus of claim 10, wherein the one or more processors are further configured to:

determine, in parallel with determining if the person is present, a difference between the data represented in the first voxel and the anchor skeleton.

14. The apparatus of claim 10, wherein the anchor skeleton is defined by a plurality of key points, and wherein to determine the difference between the data represented in the first voxel and the anchor skeleton, the one or more processors are further configured to:

determine the difference between the data represented in the first voxel and each of the key points of the anchor skeleton.

15. The apparatus of claim 10, wherein the one or more processors are further configured to:

process the determined one or more persons and the pose for each of the one or more persons using a non-maximum-suppression technique to remove duplicates of the one or more persons.

16. The apparatus of claim 10, wherein the network is a deep neural network, and wherein the one or more processors are further configured to:

process a plurality of voxelized frames using the deep neural network to determine at least one person relative to the LiDAR sensor and a sequence of poses for the at least one person; and determine an action for the at least one person from the sequence of poses.

17. The apparatus of claim 10, wherein the apparatus comprises an automobile that includes the LiDAR sensor.

18. The apparatus of claim 10, wherein to process the point cloud to produce the voxelized frame including the plurality of voxels, the one or more processors are further configured to:

adaptively generate the plurality of voxels using a neural network.

19. The apparatus of claim 10, wherein the one or more processors are further configured to:

make an autonomous driving decision based on the pose for each of the determined one or more persons.

20. An apparatus configured to perform pose estimation, the apparatus comprising:

means for receiving a point cloud from a LiDAR sensor, the point cloud including a plurality of points representing positions of objects relative to the LiDAR sensor, wherein each of the plurality of points indicates a position and an intensity;

means for processing the point cloud to produce a voxelized frame including a plurality of voxels, wherein each of the plurality of voxels includes a number of the points of the point cloud in the voxel, the positions of the points in the voxel, and the intensities of the points in the voxel;

means for processing the voxelized frame using a network to determine a position of one or more persons relative to the LiDAR sensor and a pose for each of the one or more persons, wherein the means for processing the voxelized frame using the network comprises:

means for determining, for a first voxel of the voxelized frame, if a person is present;

means for activating an anchor skeleton for the first voxel based on the determination;

means for determining a difference between data represented in the first voxel and the anchor skeleton in the case that the anchor skeleton is activated, and means for estimating a pose of the data represented in the first voxel based on the difference; and means for outputting a location of the determined one or more persons and the pose for each of the determined one or more persons.

* * * * *